July 28, 1931. C. B. BAILEY 1,815,893
GASKET
Filed July 18, 1929
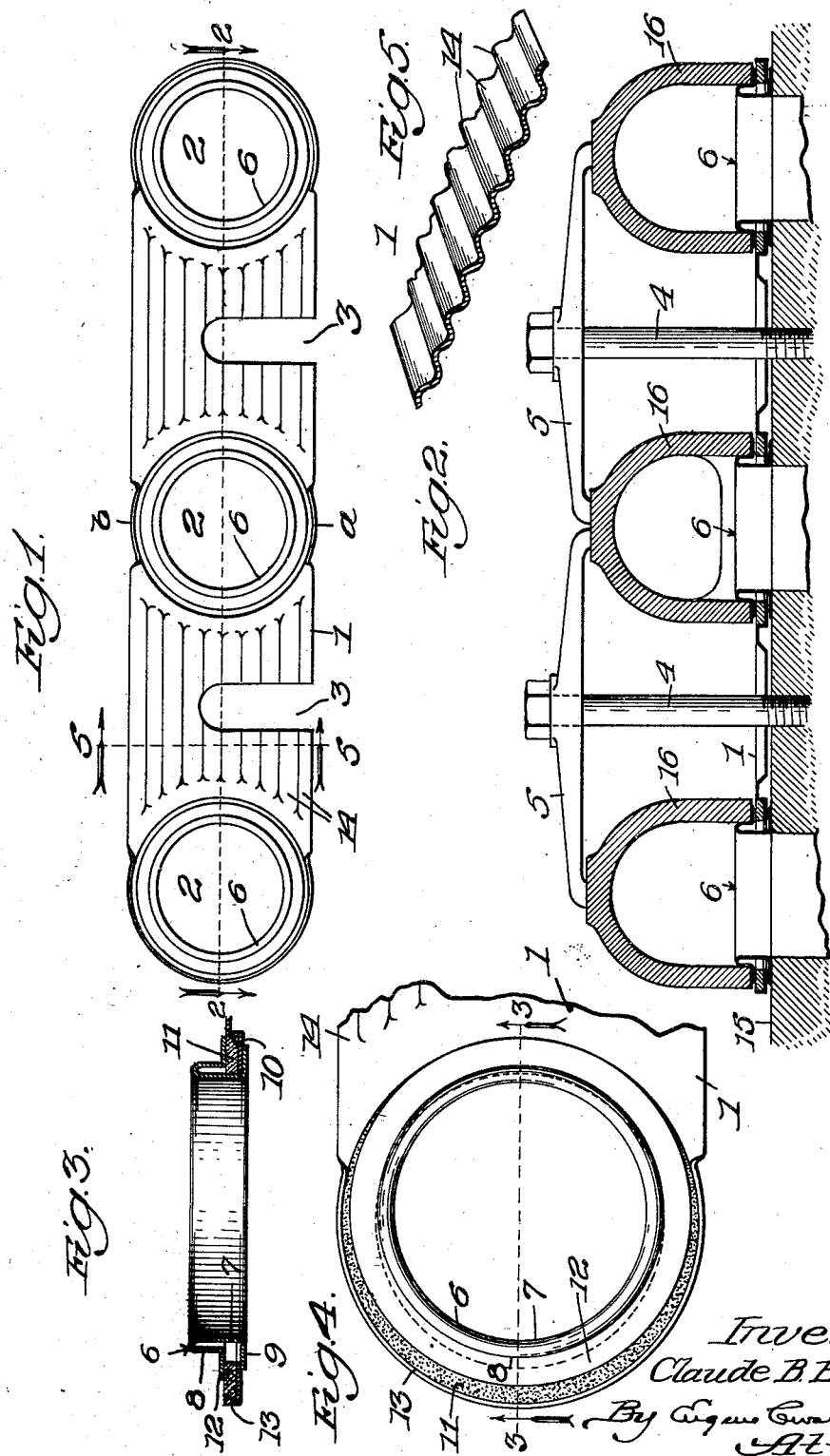
Inventor,
Claude B. Bailey, Patented July 28, 1931

1,815,893

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed July 18, 1929. Serial No. 379,093.

This invention relates to gaskets, and more particularly to manifold gaskets, such as are in elongated or strip form and have a plurality of port holes spaced lengthwise of the gasket body so that a single gasket may accommodate a plurality of port openings in the cylinder block and the pipes of the associated manifolds and gaskets as employed in connection with automobile engines at the intake and exhaust ports of the several cylinders.

In my co-pending application, Serial No. 106,354, filed May 3, 1926, I have disclosed and claimed a manifold gasket having its body portion of a single layer of sheet metal and corrugated lengthwise between the port holes therein to stiffen the gasket layer against bending. In said co-pending application I have also disclosed and claimed tubular guides of sheet metal integrally connected with the body layer about the respective port holes for guiding the manifold pipes into registration with the associated port holes in the cylinder block.

In my co-pending application, Serial No. 178,526, filed March 26, 1927, I have disclosed and claimed the guides as being made separate from the corrugated body layer and inserted in the port holes, the latter being larger in diameter than the guides, so that the guides may be slid or adjusted in the plane of the port holes to center the guides with respect to the manifold pipes and thus take care of those which are out of line with the ports in the cylinder block due to warping or distortion of such pipes as occurs from the extreme heat to which the pipes are subjected on the exhaust side of the engine.

In both of said applications, the pressure and joint sealing portions of the gasket are formed entirely of sheet metal by utilizing the metal layer of the gasket body about the port holes and the flanges at the bases of the tubular guides where such flanges engage the gasket body at the port holes. This is not objectionable, although to provide the cushion required to fill the interstices of the opposed metal surfaces between which the gasket is clamped, it is necessary to increase the number of metal layers when these surfaces are unduly irregular, as when the surfaces are relatively rough.

The object of my invention is to employ a ring of refractory material, such as asbestos, at each port hole of the gasket, and thus have the ring furnish the amount of cushioning desired for the various degrees of roughness of the surfaces referred to and thus avoid the expense of increasing the metal layers beyond that which as actually required to connect the guides with the body layer of the gasket and hold the refractory rings against the same.

Another object of my invention is to provide recesses in the body layer of the gasket about the respective port holes to accommodate the refractory rings and thereby have them entirely closed and protected by the metal of the gasket structure.

Another object of my invention is to have the corrugations in the gasket layer terminate at the outer edges of these recesses so that the latter can be made without affecting the stiffening function of the corrugations.

The invention consists further in the matters hereinafter described and claimed.

In the accompanying drawings:

Fig. 1 is a top plan view of a manifold gasket constructed in accordance with my invention;

Fig. 2 is a longitudinal sectional view taken through the gasket on line 2—2 of Fig. 1 and showing the gasket clamped in place between a cylinder block and the associated manifold pipes;

Fig. 3 is an enlarged diametric sectional view taken through the gasket at one of the port holes therein to show the form of the guide and the manner in which it is slidably mounted in the port hole, said section being taken on line 3—3 of Fig. 4;

Fig. 4 is a top plan view of the structure shown in Fig. 3; and

Fig. 5 is a perspective sectional view taken on line 5—5 of Fig. 1.

The manifold gasket shown in the drawings has a relatively narrow and elongated body portion 1 of a single layer of sheet metal, such as copper, brass, aluminum, zinc or the like. The body layer 1 is provided with a plurality of port and stud openings 2, 3 spaced lengthwise of the layer, with the port holes or openings 2 larger than the stud openings 3. The latter are in the form of slots extending through one edge of the body layer 1 so that the gasket may be readily and easily applied edgewise over the studs 4, 4 of the manifold clamps 5, 5 without requiring that the clamps be removed from the studs, as would be the case should these openings be in the form of bolt holes.

The gasket is provided with a plurality of tubular guides 6, 6 about the respective port holes and project outward from one side of the body layer 1. The guides are made of sheet metal independent of the body layer 1, and are inserted in the port holes 2, 2.

Each guide as shown in Figs. 2 and 3, is folded on itself to provide inner and outer annular portions 7, 8 integrally connected by the fold in the metal between them, said fold forming the outer edge of the guide. The inner member 7 extends through the port hole 2 of the gasket, and is provided with a base flange 9 which completely surrounds the guide on the outside thereof, and overlaps the layer 1 on the side opposite the guide, as clearly shown in Fig. 3. The layer 1 immediately about the port hole 2 is struck downward to provide an annular channel or recess 10 to accommodate a ring 11 of refractory material, such as asbestos. The ring 11 substantially fills the recess and has its inner edge terminating at the inner edge of the port hole 2. The outer portion 8 of the guide is provided with a base flange 12, which overlaps the ring 11 and holds the same in the recess. The diameter of the port hole 2 is considerably larger than the outside diameter of the inner portion 7 of the guide 6, and the base flange 12 of the outer portion 8 of the guide has a diameter less than the outside diameter of the ring 11, so that the guide 6 may be adjusted or slid in the plane of the port hole. This allows for centering of the guide with respect to the manifold pipe in case such pipe is out of line with the port hole in the cylinder block. The flanges 9 and 12 are not required to fit tightly against either the body layer 1 or the ring 11, and consequently the guide is relatively free to slide in the plane of the port hole and thus allow the guide to center itself with respect to the manifold pipe on applying the pipe over the guide. The flanges 9 and 12 need only be made wide enough to retain their connection with the body layer 1 and the ring 11 in all positions of adjustment of the guide, thereby reducing the expense of manufacturing the gasket by avoiding any excess metal in these flanges.

The ends of the gasket may be rounded, as shown in the drawings, by having the upstanding flanges 13 of the recesses 10 at the ends of the gasket form the ends thereof. This will aid in reducing the cost of manufacturing the gasket by avoiding the extension of the gasket layer 1 beyond these flanges. The outer diameters of the recesses 10 are substantially equal to the width of the body layer 1. The recess 10 intermediate the ends of the gasket has its outer diameter intersecting the side edges of the body layer 1, and there has its upstanding outer wall bridging the space between the portions of the body layer on opposite sides of said recess, as indicated at a, b in Figure 1. This also aids in reducing the expense of manufacturing the gasket because the metal of the body layer in width may be kept within the outside diameter of the several recesses 10.

To stiffen the body layer 1 against bending and distortion, I provide the same with a plurality of corrugations 14, 14. These extend lengthwise of the body layer 1 and in stiffening the same allow the body of the gasket to be made of a single layer of sheet metal of relatively thin gauge. As shown in Figure 1 the corrugations are disposed between the guides 6, 6 and are arranged parallel to each other and to the side edges of the gasket. The corrugations terminate short of the recesses 10, 10, and thus do not interfere with the stamping of such recesses, nor do they interfere with the pressure and joint sealing sections of the gasket, as provided by the ring 11 and the associated metal walls of the recesses 10 and the flanges 9 and 12 of the guides, as indicated in Figure 2. In this figure I have shown the gasket in the place of use and clamped between the cylinder block 15 and the manifold pipes 16. The body layer 1 is relieved of any clamping pressure which is exerted on the gasket by the clamps 5, 5, and thus permits the body layer 1 to serve merely as a connector for the combined guides and pressure receiving and joint sealing sections of the gasket. Moreover, the body layer 1 is merely required to serve as a support for these sections and their rings 11, as the clamping pressure on the gasket is confined to these sections and is not distributed over the body layer, as in the three-layer or composite gaskets as heretofore employed. The body layer 1 may thus be made of a single layer of sheet metal of relatively thin gauge. With the recesses 10 extending below the plane of the body layer 1 the latter does not necessarily contact with the portion of the cylinder block 15 between the manifold pipes. In other words the lower portions of the recesses and the flanges 9 of the guides constitute the seating sections for the gasket and thus relieves the portion of the body layer between the guides of that duty.

By corrugating the body layer, the gasket may be made cheaper and will stand up to better advantage due to elimination of excess material heretofore required to make the gasket stiff enough for manifold purposes. Moreover, by the corrugations, the body layer 1 will be made stiff enough to permit the use of slotted stud holes, as described.

In Figure 4 I have shown the guide 6 adjusted to an extreme position eccentric to the center of the port hole 2.

The details of structure shown and described may be variously changed and modified without departing from the spirit and scope of my invention.

I claim as my invention:

1. A gasket having a single body layer of sheet material with an opening therein, said layer being depressed to provide a recess about said opening, a ring of refractory material in said recess, and a tubular guide made separate from the body layer and inserted in said opening, said guide being slidably mounted in the opening and having flanges overlapping the body layer and the ring respectively.

2. A gasket having a single body layer of sheet material with an opening therein, said layer being depressed to provide a recess about the opening, a ring of refractory material fitted in said recess and having its inner edge terminating at the edge of the opening, and a guide made separate from the layer and inserted in the opening, said guide having flanges overlapping the body layer and ring respectively, said opening being larger than the guide so that the latter may have movement in the plane of the opening, said flanges having a width less than the width of the ring and the recess.

3. A manifold gasket having an elongated body portion of a single layer of sheet metal and having a plurality of port holes therein spaced apart lengthwise of the body layer, said layer being depressed about each port hole to provide a recess about the same, a refractory ring in each recess, and tubular guides made separate from the body layer, one for each port hole and inserted therein, said guides having flanges overlapping the body layer and ring respectively, said port holes being made considerably larger than the diameter of the guides so that the latter may have independent movement in the plane of the port holes.

4. A manifold gasket having a body portion of a single layer of sheet metal with a plurality of port holes therein spaced apart lengthwise of the body layer, said layer being depressed to provide recesses about the respective port holes, a refractory ring in each recess, tubular guides extending outward from one side of the body layer at the respective port holes and slidably mounted therein, the portion of the body layer forming the recesses extending beyond the plane of the body layer on the side opposite the guides and forming the seating sections for the gasket.

5. A manifold gasket having an elongated body portion of a single layer of sheet metal with a plurality of port holes therein spaced apart lengthwise of the gasket body, said layer being formed to provide recesses about the respective port holes, a ring of refractory material in each recess, and tubular guides at the respective port holes and slidably mounted therein, said guides having flanges engaging the body layer and rings respectively, and corrugations provided in the body layer between the adjacent port holes and extending lengthwise of the body layer.

6. A manifold gasket having an elongated body portion of a single layer of sheet metal with a plurality of port holes therein spaced apart lengthwise of the gasket, said layer being formed to provide recesses about the respective port holes, a ring of refractory material in each recess, tubular guides for the respective port holes and slidably mounted therein, said guides having flanges overlapping the body layer and rings respectively, and corrugations in the portion of the body layer between the adjacent port holes, said corrugations extending lengthwise of the body layer and terminating short of the recesses therein.

In testimony whereof I affix my signature.

CLAUDE B. BAILEY.